APPARATUS FOR PROJECTING TELEVISION IMAGES IN COLOR

Filed Sept. 17, 1952 2 Sheets-Sheet 1

Inventor:
Paul Raibourn
by his Attorneys,
Darby + Darby

Nov. 8, 1955 P. RAIBOURN 2,723,305

APPARATUS FOR PROJECTING TELEVISION IMAGES IN COLOR

Filed Sept. 17, 1952 2 Sheets-Sheet 2

Inventor:
Paul Raibourn
by his Attorneys,

United States Patent Office 2,723,305

Patented Nov. 8, 1955

2,723,305

APPARATUS FOR PROJECTING TELEVISION IMAGES IN COLOR

Paul Raibourn, Southport, Conn., assignor to Chromatic Television Laboratories, Inc., New York, N. Y., a corporation of California Application September 17, 1952, Serial No. 310,058

10 Claims. (Cl. 178—5.4)

The present invention relates to the projection of television images in color and particularly to a method of projection using an eidophor light valve.

The projection of television images through the use of such an eidophor valve has been proposed and is described for example in Radio Craft for October 1946.

The device described in the article above-mentioned produces large images by a projection method, but is limited to the production of black and white images. However, the eidophor system described in the above-mentioned article has been extended to low switching rate color television systems such as the field sequential but only when the equipment was mechanical in nature such for example as a rotary color disk.

The present invention relates to an all electronic system for the production of large screen color images using field sequential, dot sequential, simultaneous or other color television systems no matter what the switching rate.

It is an object of my invention to provide an all electronic color television system adapted to produce large colored images and utilizing an eidophor light valve.

It is a further object of my invention to provide such a system which may be adapted to any color switching rate for example field sequential, dot sequential, simultaneous, etc.

It is a further object of my invention to provide a system as mentioned above which is relatively simple to construct and readily maintained.

Other objects and features of the invention will appear when the following description is considered in connection with the annexed drawings, in which, Figure 1 is a perspective diagram of a projection television system in accordance with my invention;

Figures 1, 3, 4:
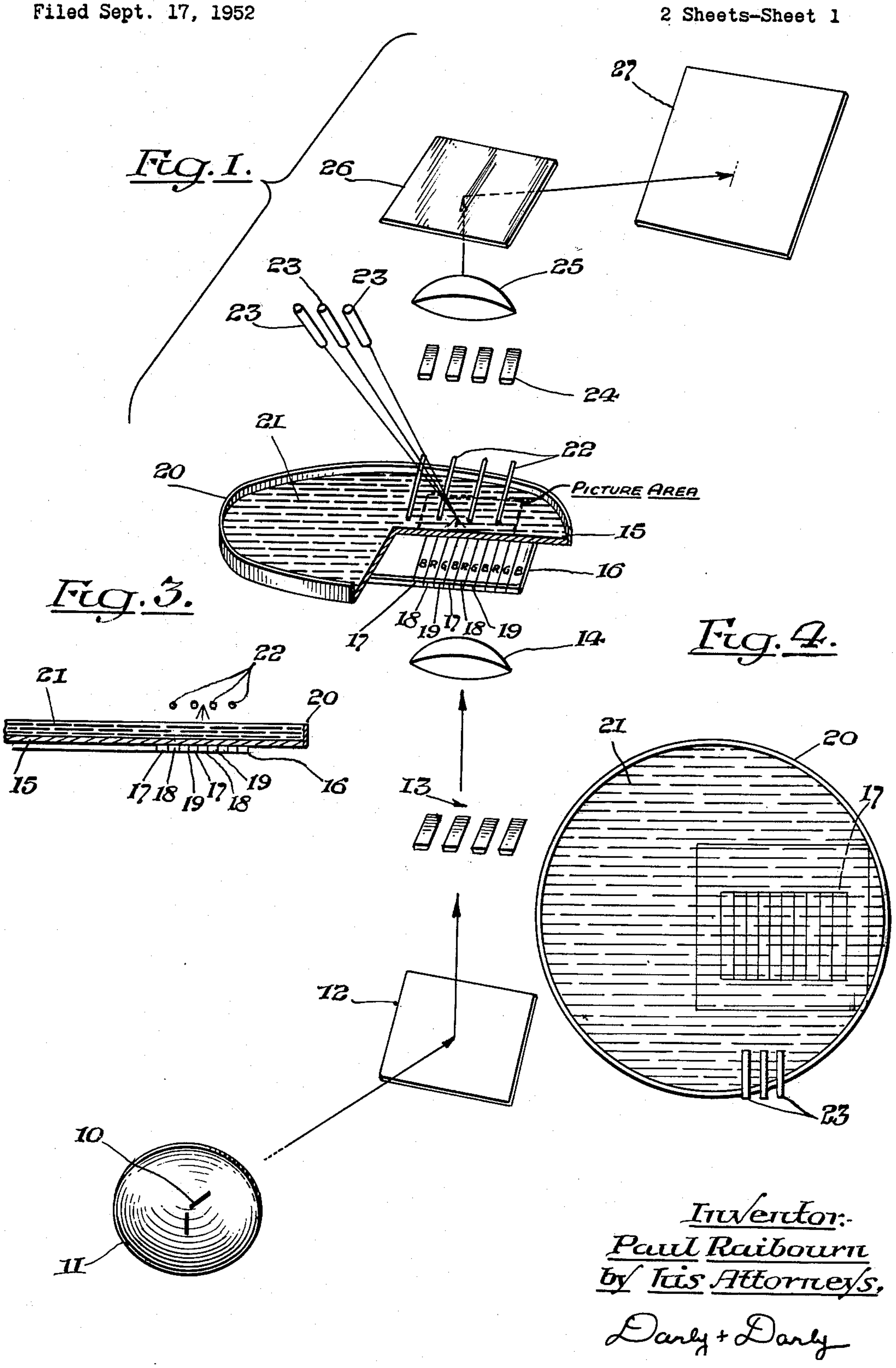
Figure 3 is a fragmentary cross-sectional view of the eidophor disk of Figures 1 and 2, the section being taken on the plane of the line 3—3 of Figure 2.
Figure 4 is a top plan view of the eidophor disk showing the relationship of electron beam guns to the disk and particularly to the scanning or picture area of that disk.
Figure 2:
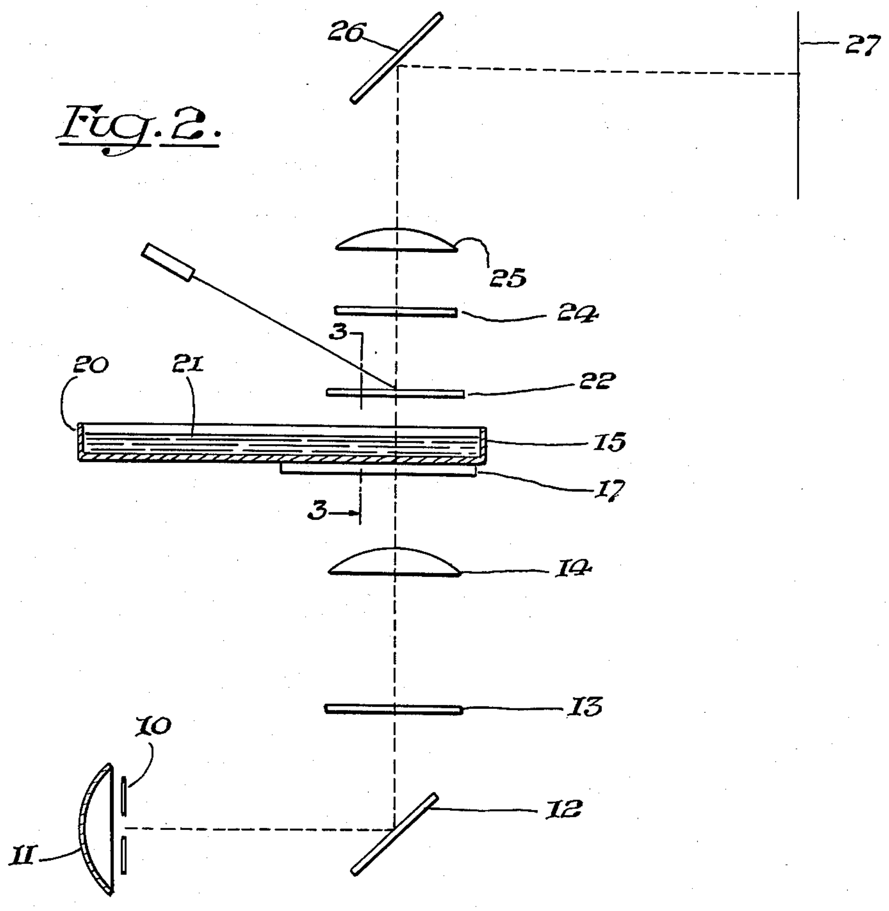
Figure 2 is a side elevational view of the system illustrated in Figure 1 showing the relative locations of parts.

Referring now to the drawings, there is shown at 10 a source of light such for example as a carbon arc located within a reflector 11. Light from the source 10 is reflected by the reflector 11 and strikes a plane mirror 12 which mirror reflects the light upwardly, and through a light control system including the bars 13 and the optic 14. The bars and optic respectively designated 13 and 14 may be combined in a single structure which is commonly known as a Schlieren optic.

The light which passes between the bars 13 and through the optic 14 is focused upon an ediophor disk 15 which disk is mounted in such a manner that it may be slowly rotated, the disk being within an evacuated chamber, a portion of the lower wall of which is shown at 16. The wall or plate 16 has transparent color strips 17, 18 and 19 thereon, the strips extending throughout the area which is scanned by the electron beam or beams as will hereinafter appear.

The upper surface of the eidophor disk 15 is coated with a transparent layer of conducting material such as metal or "Neica," the latter being a specially prepared stannous chloride. The eidophor disk is formed with a rim 20 thereon and a body of oil lies on the disk 15 as indicated at 21. In the three electron gun embodiment of the invention as shown in Figures 1 through 4 there are a plurality of grid wires 22 located above the surface of the oil and extending parallel to the strips 17, 18 and 19. The longitudinal extent of the wires is identical with the longitudinal extent of the strips 17, 18 and 19. All grid wires 22 are electrically connected together and to an external terminal and a potential is applied between this external terminal and the transparent conductive layer on the upper surface of the eidophor disk, the potential being preferably three times the accelerating potential.

These wires are placed in the correct electron optic relationship above the center lines of alternate transparent color strips, the wires 22 forming a plurality of electron lenses which lenses are the electrical equivalent of cylindrical lenses. All electrons entering a given electron lens at a specific angle will strike the oil surface at the same point. Electrons striking the lens at a slightly different angle will strike the oil surface at another point.

Within the enclosure previously mentioned are a plurality of electron guns 23. Each gun is assigned to strike a particular section of the oil screen 21 and light passing through that section of the oil will then pass through a specified color strip. The beam from each gun is then converged in the plane of the cylindrical lens from which point the cylindrical lens focuses the electron beam on to the oil surface. Since there are three electron guns, each in a distinct place, the three beams enter the cylindrical lens at slightly different angles and in the manner described above activates sections of the oil surface to produce the proper color.

While Figures 1 and 3 show the wires placed directly above alternate color strips, this is merely for purposes of illustration. Actually the wires and color strips are placed so that they appear electron-optically above one another. The particular electron optical arrangement briefly described above is disclosed in detail in the co-pending application of Ernest O. Lawrence, Serial No. 219,213, filed April 4, 1951, and Serial No. 234,190, filed June 29, 1951.

As in the known eidophor system when an electron beam strikes the oil surface a dimpling of the oil surface occurs thereby changing the refraction of light at that point. It will be clear therefore that as the electron beam scans the oil surface in the area alloted thereto the three beams cause varying degrees of dimpling dependent upon the incoming signal corresponding to the particular color to which each electron gun is assigned. This results in varying degrees of refraction of the different colored beams which impinge upon the lower surface of the transparent oil 21 and are transmitted through it.

Although an eidophor system in which the light is caused to be refracted by an electron beam impinging upon an oil surface has been above-described, it will be understood that an eidophor system of the reflection type may equally well be utilized.

As will be noted the electron guns 23 are offset forwardly (as seen in Figure 1) of the vertical axis of the light path through the disk 15 so that light passing through the color strips 16 and the disk 15 and oil 21 will not be obstructed by the physical structure of the electron guns.

Located above the disk 15 in the path of light through the scanned area is a second Schlieren optic comprising the bars 24 and lens 25. The bars 24 of this set are aligned with the spaces between the bars 13 of the lower Schlieren optic so that when there is no electron beam impinging upon the surface of the oil no light passes through the structure and the amount of light which passes through is determined by the number of electrons which strike an elemental area at any instant, and the consequent dimpling and varied refraction of the oil at that particular point. The number of electrons that strike such an elemental area may be determined either by intensity modulation or velocity modulation of the electron beam. Light which passes through the upper optic 25 impinges upon a plane mirror 26 which is set at any desirable angle and which deflects the light to a screen 27 on which the received picture is projected.

It will be understood that a focusing potential difference exists between the grid wires 22 and the transparent metallic coating on the upper surface of the disk 15, this difference of potential acting to form the cylindrical electron lens heretofore mentioned.

This disk 15 is rotated slowly in order that the liquid may be cooled and likewise smoothed as for example by the use of a doctor blade so that no charges which have accumulated thereon will cause persistence of the dimpling. For short periods of operation it is unnecessary that the disk be rotated.

Figure 5:
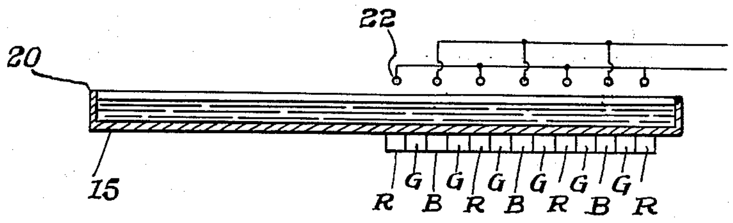
Figure 5 is a fragmentary cross-sectional view similar to Figure 3 but showing the arrangement of the transparent color strips when a single electron gun is utilized.

If desired, the device mentioned above may be utilized with a single electron gun but in this event a potential difference will exist between alternate wires 22 of the grid structure so that the electron beam will be caused to impinge in sequence upon the oil lying above the proper one of certain color strips as indicated in Figure 5. In this case the color strips mentioned will be in a different order such as red, green, blue, green, etc. or green, red, blue, red, green, red, etc. or green, blue, red, blue, etc. With this arrangement and considering the red, green, blue, green sequence, grid wires 22 will be placed electon-optically above each red strip and each blue strip, alternate grid wires 22 being electrically connected together and brought out to two external terminals. Switching arrangements are then provided for rendering the sets of grid wires of opposite potential with respect to each other and for reversing the potentials to effect color switching. The potential applied between these grid wires and the transparent conductive layer on the upper surface of the eidophor disk 15 is preferably three times the accelerating potential as in the other gun arrangement above described.

It will be appreciated that by means of the structure above-described a picture may be readily formed on the screen which may be of a much larger size than is practical when the face of the television tube is utilized as the screen and that a picture may be formed in color whether the transmititng and receiving system is of the simultaneous, field sequential, dot sequential, or other known color systems. As previously noted, velocity modulation of the electron beam may be utilized in connection with the present system.

While I have described the preferred form of my invention, it will be understood that many modifications of the structure may be made within the scope of the invention. Therefore, I wish to be limited not by the foregoing description but, on the contrary, solely by the claims granted to me.

What is claimed is:

1. A system for projecting a color television picture by means of electron beams and a separate light source, comprising in combination with a cathode ray tube as a source of electron beams and a separate source of light rays, a moving liquid film in the path of the electron beams and light rays, said film being adapted to be deformed by the electron beams into areas differently modifying the path of the light rays in accordance with changing characteristics of the electron beams, a recurring sequence of color filter strips located in the path of the light rays and a plurality of cylindrical electron lenses located in the path of the electron beams and serving to direct said electron beams to areas of said liquid film in alignment with particular ones of said filter strips as said beams are scanned to produce the complete picture.

2. A system for projecting a color television picture by means of electron beams and a separate light source, comprising in combination with a cathode ray tube as a source of electron beams and a separate source of light rays, a moving liquid film in the path of the electron beams, a portion of which film is scanned by said electron beams, said film being adapted to be deformed by the electron beams into areas differently modifying the path of the light rays in accordance with changing characteristics of the electron beams, a plurality of recurring sequences of color filter strips of different colors located in the path of light rays, said filter strips covering the entire area scanned by the electron beams, a grid structure comprising a plurality of wires adjacent the surface of said liquid film on which said electron beams impinge, said wires extending in a direction parallel to said color strips and lying above alternate ones thereof, a transparent metallic coating underlying said liquid film and means for applying an electrical potential between said grid wires and said metallic coating to focus the electron beams upon the liquid film in alignment with the color strips during the scanning of said scanned portion of the moving liquid film.

3. A system as claimed in claim 2, characterized in that said color filter strips extend in lines perpendicular to the direction of scanning of the electron beams.

4. A system as claimed in claim 2, characterized in that said color filter strips extend in lines parallel to the direction of scanning of the electron beams.

5. A system as claimed in claim 2, characterized in that said recurring sequence of color strips comprises strips of red, blue and green.

6. A system as claimed in claim 2, characterized in that the electron beams are supplied by three cathode ray gun structures and further characterized in that strips of three colors are provided, one gun being associated with the strips of each color.

7. A system for projecting color television pictures by means of electron beams and a separate light source, comprising in combination with a cathode ray tube as a source of electron beams and a separate source of light rays, a moving liquid film a portion of which is in the path of the electron beams and light rays, said liquid film being adapted to be deformed by the electron beams into areas differently modifying the path of the light rays in accordance with changing characteristics of the electron beams, said liquid film being located within the evacuated cathode ray tube, a plurality of recurring sequences of transparent color filter strips of different colors located in the path of the light rays and covering the entire area of the liquid film to be scanned by the electron beams, said filter strips being fixed to the outside of the envelope of the cathode ray tube, a grid structure comprising a plurality of wires located within said evacuated envelope and adjacent the upper surface of the liquid film, said grid wires being in the path of light rays through alternate ones of said color strips, a transparent metallic coating underlying the liquid film, means connecting alternate ones of said grid wires together thereby forming two sets, means supplying an electrical potential between said grid wires and said metallic coating and between the grid wires of the two sets, and means for reversing the potential of said two sets of grid wires to thereby focus the electron beams upon the liquid film in alignment with proper color strips as the scanning of the liquid film by the electron beams is effected.

8. A system as claimed in claim 7, characterized in that said color filter strips extend in lines perpendicular to the direction of scanning of the electron beams.

9. A system as claimed in claim 7, characterized in that said color filter strips extend in lines parallel to the direction of electron beam scanning.

10. A system as claimed in claim 7, characterized in that said recurring sequences of color filter strips comprises strips of red, green, blue and green.

References Cited in the file of this patent

UNITED STATES PATENTS

| | | |
|---|---|---|
| 2,391,451 | Fischer | Dec. 25, 1945 |
| 2,446,791 | Schroeder | Aug. 10, 1948 |
| 2,634,326 | Goodrich | Apr. 27, 1953 |

FOREIGN PATENTS

| | | |
|---|---|---|
| 866,065 | France | June 6, 1941 |